UNITED STATES PATENT OFFICE.

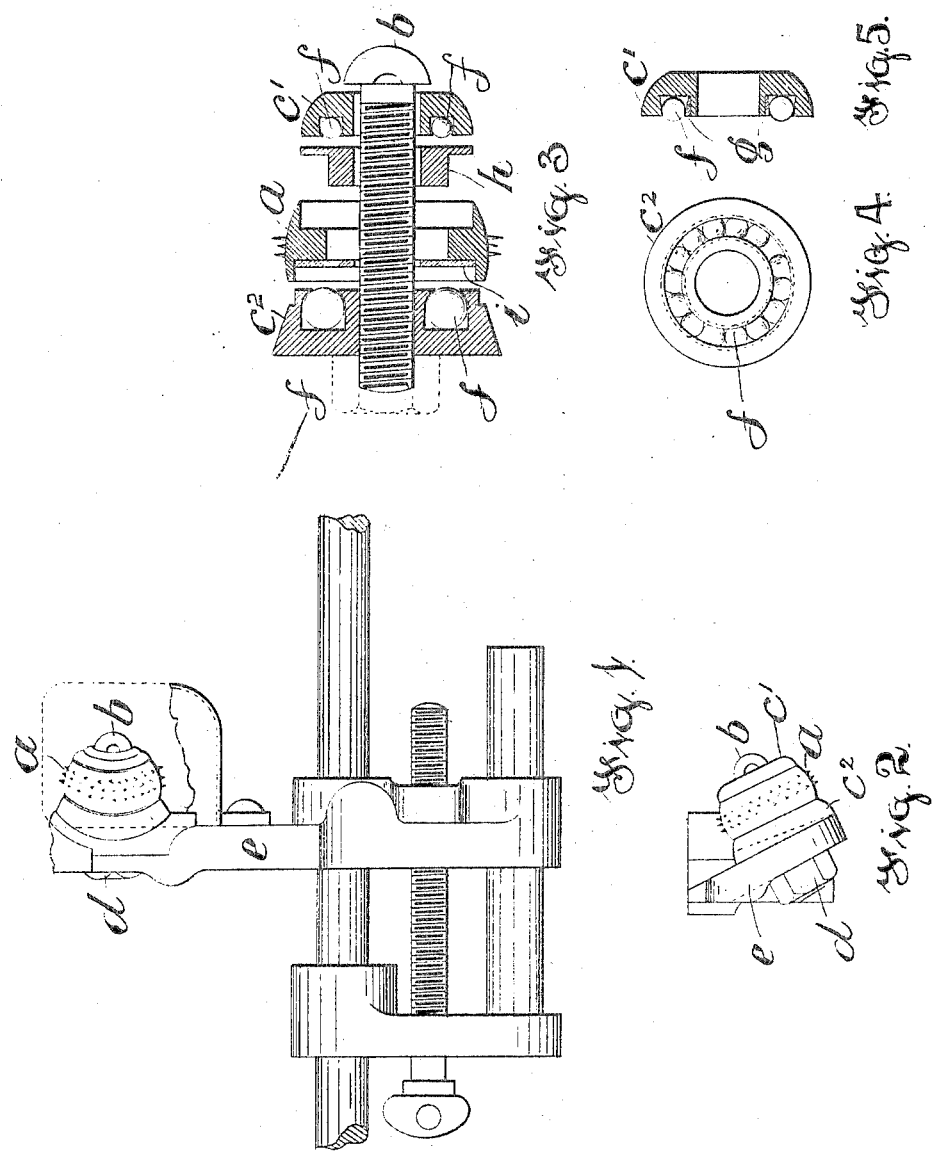

WILLIAM LUPTON, OF ACCRINGTON, ENGLAND.

LOOM-TEMPLE.

No. 802,818. Specification of Letters Patent. Patented Oct. 24, 1905.

Application filed November 30, 1903. Serial No. 183,153.

*To all whom it may concern:*

Be it known that I, WILLIAM LUPTON, a subject of the King of Great Britain and Ireland, and a resident of Accrington, in the county of Lancaster, England, have invented Improvements in Temples for Looms, of which the following is a specification.

This invention refers to and consists of improvements in single-ring temples for looms, whereby the temples are rendered more generally efficient and durable in use and easier to manufacture than the ordinary temples.

According to the invention each temple-ring is mounted between or upon antifriction balls or runners, and the said balls or runners are so applied that they are practically integral with the ring or its holders, and such parts may be handled without fear of the balls or runners falling out. Each temple-ring is bored at right angles to its two side faces, which are parallel, and the stud or axis, by which it is supported, is carried by the twisted part of a bracket, which holds the stud at an angle instead of horizontal, and therefore causes the ring to rotate at the required angle for stretching the cloth.

Figure 1 illustrates a plan of a complete single-ring temple and its fittings constructed according to these improvements. Fig. 2 illustrates an end or front view (in part) looking from the back of the loom. Fig. 3 illustrates an enlarged longitudinal section of the temple-ring and its holders and supporting-stud with the several parts separated from each other in order to show them more clearly. Fig. 4 illustrates an end view of one of the holders. Fig. 5 illustrates a modification in section.

Referring to Figs. 1, 2, 3, and 4, $a$ designates the temple-ring, $b$ the stud or axis on which it rotates, and $c'$ $c^2$ the two holders by and between which the ring is held in position.

$d$ is the nut by which the stud $b$ is secured to the temple-bracket $e$. This latter, as shown, is twisted to produce a beveled face at the part where the stud is attached, and thus holds the stud in a downwardly-inclined position instead of horizontally, as heretofore. In so doing it will be seen that it permits of the ring $a$ being bored at right angles to its sides, the angular position of the stud serving to hold the ring at the required angle for stretching the fabric.

In each of the holders $c'$ $c^2$ is a recess or cavity, and in such cavity are antifriction-balls $f$, the depth of the cavity being such as to cause the balls to project slightly beyond the face of the holder, as shown, so that on the parts being assembled as shown in Fig. 1 and the tension of the cloth to be stretched exercising its force on the ring $a$ the upper half of the ring presses against the balls in the holder $c'$ and its lower part presses against the balls in the holder $c^2$ and, due to the balls running freely, the ring rotates freely.

The shape of each cavity or ball-race is such that its entrance is slightly less than the full diameter of the balls, and thus while allowing the balls perfect freedom prevents them leaving the cavity. This narrowing of the entrance is effected by burnishing over the two edges of the entrance of the cavity after the balls have been inserted.

As shown in Fig. 3, an iron bush $h$ and a plate $i$ are provided for the balls to run on, the temple-ring, which is of brass, being recessed to allow room for them, or, as shown in Fig. 5, the inner periphery of the race may be made parallel to the stud $b$ and after the balls have been inserted be fitted with a tightly-fitting beveled ring, which, in conjunction with the undercut outer periphery of the race, serves to retain the balls.

What I claim is—

In a loom-temple, a bracket, a stud secured to such bracket, and said bracket where the stud is secured lying at an angle of about thirty degrees to the other parts of the bracket and holding the stud in a downwardly-inclined direction, two temple-ring holders on the said stud, each with an annular cavity, steel balls in said cavity, and the said cavity at its entrance and in depth slightly less in size than the diameter of the balls, a temple-ring between said holders and balls, wearing-plates between the balls and temple-rings, and means for securing the several parts in close contact with each other and the said stud to the said bracket, substantially as set forth.

In witness whereof I have hereunto set my hand in the presence of two witnesses.

WILLIAM LUPTON.

Witnesses:
 WALTER GUNN,
 WILLIAM EASTWOOD.